Oct. 11, 1966  I. L. NILSSON  3,278,039
ROTARY FILTER DRUM FOR CONCENTRATING
DILUTED FIBRE SUSPENSIONS
Filed Jan. 6, 1966  2 Sheets-Sheet 1

Inventor
Ivar L. Nilsson
By
Wenderoth, Lind & Ponack
Attorneys

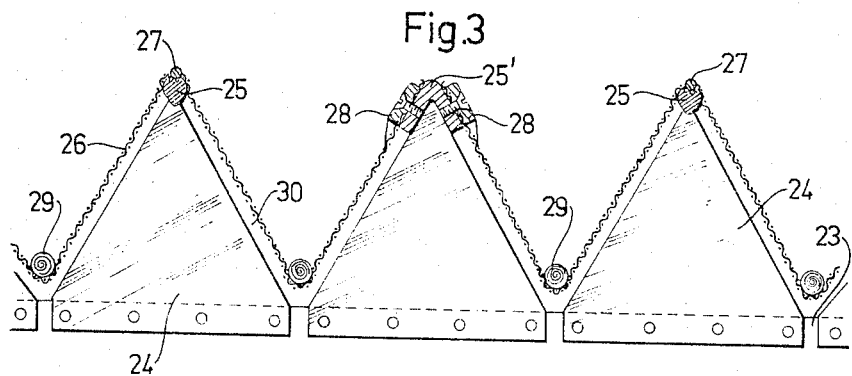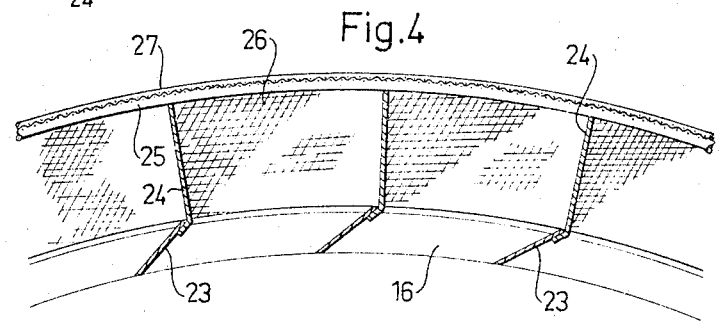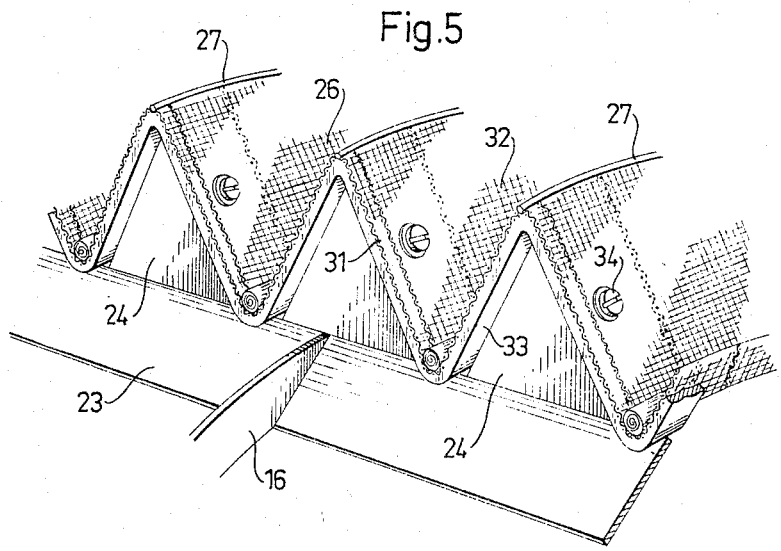

United States Patent Office 3,278,039
Patented Oct. 11, 1966

3,278,039
ROTARY FILTER DRUM FOR CONCENTRATING DILUTED FIBRE SUSPENSIONS
Ivar Linus Nilsson, Vargon, Sweden, assignor to Aktiebolaget Vargons Mek. Verkstad, Vargon, Sweden
Filed Jan. 6, 1966, Ser. No. 519,118
Claims priority, application Sweden, Feb. 2, 1965, 1,327/65
3 Claims. (Cl. 210—403)

The invention relates to a rotary filter drum for concentrating diluted fibre suspensions. The filter drum is of the known type which comprises two solid end walls, a number of parallel rods forming together a cylindrical cage which extends axially between said end walls, brackets projecting radially from the rods and arranged in axial as well as in peripheral rows, a ring mounted on each peripheral row of brackets, a bellows-shaped strainer jacket enclosing the cage and its rings between the end walls, each of said rings serving to support internally one fold of the bellows, an axial drum inlet for fibre suspension to be filtered, a funnel provided within the drum to collect concentrated fibres which are to be removed from the inside of the strainer above the liquid level in the drum, and an outlet from said funnel extending axially through one of the end walls.

The bellows shape of the strainer jacket of the filter drum indicated above results in an increased filtering capacity of the drum. In the case of highly diluted suspensions, however, the difficulty arises that a great proportion of the fibres tend to pass through the strainer before a sufficiently thick filtering layer of fibres has had time to settle on the inside of the strainer. To avoid this inconvenience, the filter drum according to the invention has been designed such that said brackets consist of substantially triangular plates disposed crosswise to the folds of the bellows-shaped strainer and dimensioned to leave narrow passages along the strainer surfaces opposite to the adjacent edges of the plates. At the rotation of the drum the fibre suspension is forced through these passages and an accelerated flow occurs in parallel to the strainer surfaces. Thereby the fibres become, to a great extent, oriented in the direction of flow and are more readily caught by the strainer. Preferably, the axially extending rods at the inner side of the strainer jacket are designed as inclined plates or blades which contribute in generating the desired flow in the peripheral direction of the drum.

An embodiment of the device according to the invention is described in more detail below with reference to the accompanying drawings, in which:

FIGURE 3 shows an axial section through a portion of the drum jacket and adjacent elements;

FIGURE 4 shows a radial section through the drum jacket and adjacent elements;

FIGURE 5 shows a perspective view of a portion of the drum jacket.

Figure 1:
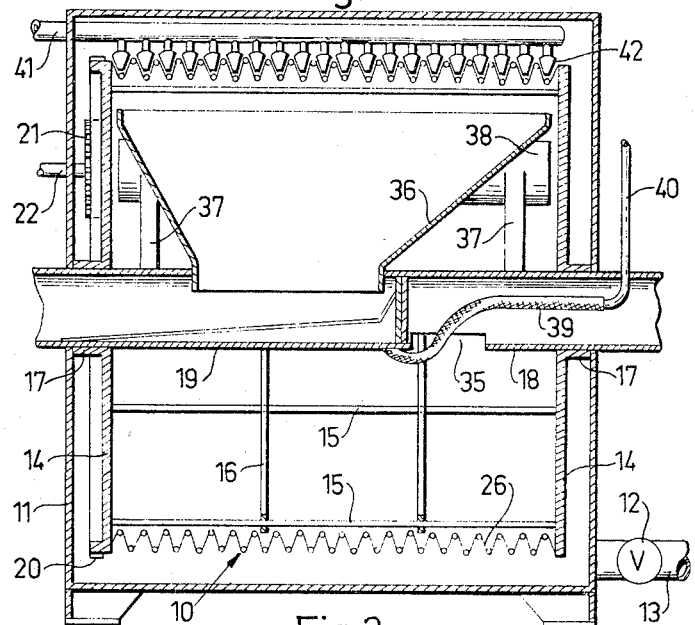
FIGURE 1 shows the filter drum in axial section, the axial ribs and some other details being left out for better clarity.
Figure 2:
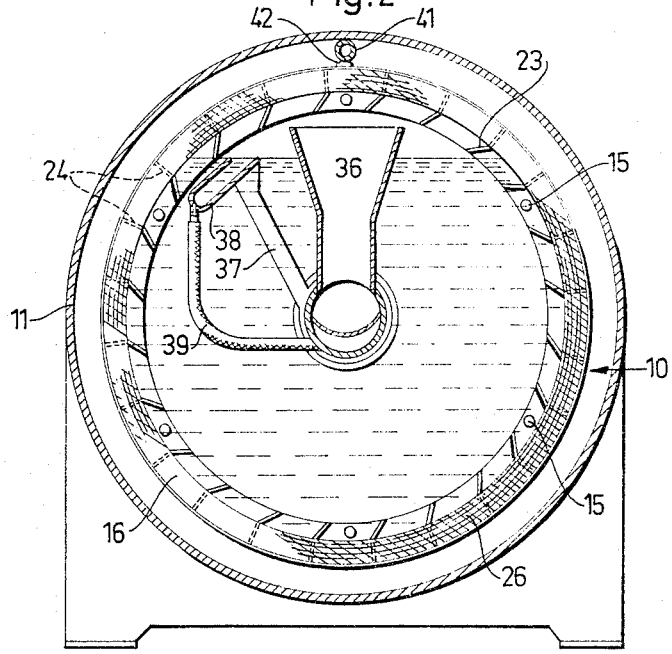
FIGURE 2 shows a cross section of the drum.

In FIGS. 1 and 2, a horizontal filter drum 10 is mounted axially within a cylindrical vessel 11. An outlet 13 near the bottom of said vessel is controlled by means of a valve 12. The drum has two solid circular end walls 14 connected by axially extending tubes or rods 15 spaced around the circumference. The tubes or rods 15 carry a number of spaced rings 16 with an outer diameter slightly smaller than that of the end walls 14. The two end walls 14 are provided with hubs 17 which are journalled on stationary tubes 18 and 19 mounted axially in alignment and extending through the end walls of the vessel 11. A gear ring 20 mounted on one end wall of the drum meshes with a gear wheel 21 on a driving shaft 22 which passes through the adjacent wall of the vessel, and thereby the drum may be driven at a low speed of rotation.

The end walls 14 and the intermediate rings 16 carry axially extending plate-like ribs 23 spaced around the circumference of the drum (FIG. 2). The ribs 23 are inclined in relation to the respective tangential planes of the drum in such a way that they serve as a kind of elevator blade at the rotation of the drum in one direction. Thus, in FIG. 2 the drum is intended to rotate anti-clockwise in operation. The rings 16 and the ribs 23 are joined by scarfing or lashing, i.e. they have interengaging transverse slits, and in the embodiment shown the ribs have such a width that they extend between the outer and inner peripheries of the rings. The distance between the ribs 23 may be 20 cm., for instance.

Each rib 23 carries a row of substantially triangular plates 24 (FIG. 3) which extend from the outer edge of the rib with their tips directed radially outwards. In circumferential direction the plates 24 are mounted such that the tips of subsequent plates are located in a common radial plane, and the plate tips in each radial plane carry together a ring 25 or 25' welded thereto. The rings 25, 25' serve to support the outwardly facing folds of a bellows-shaped strainer 26, preferably made of wire gauze. In FIG. 3, the rings 25 are heart-shaped in cross section to facilitate an attachment of the wire gauze by tightening a surrounding wire 27. To join adjacent ends of two wire gauze segments the rings 25' may have an angular cross section, their apices turned outwardly, in which case said ends are clamped to the sides of the rings by means of arcuate lists 28 fixed by screws. The strainer or wire gauze 26 is kept stretched between the supporting rings 25, 25' by means of resilient rings 29 inserted under tension in the inwardly facing folds of the bellows. Although a strainer 26 of wire gauge or plastics (nylon threads) is probably preferred, it may be possible in some cases to use a drum jacket of perforated sheet metal.

As apparent from FIG. 3, the plates 24 and the supporting rings 25, 25' are dimensioned and disposed such that narrow slots 30 having a width of about 5 mm., for instance, are formed between the edges of the plates 24 and the strainer portions extending in parallel to said edges. At the rotation of the drum these slots 30 form passages of flow for the liquid which is thereby forced to flow in parallel and close to the surface of the strainer. As the fibres readily orient themselves in the direction of flow, they will consequently get a lesser tendency to pass through the openings in the strainer surface.

The bellows-like strainer forming the drum jacket is produced most simply by joining segments which may extend, in peripheral direction, around one sixth of the circumference, for instance. In the case of large drums, 2–4 such segments may be mounted axially one after the other. The segments may be given the required shape by pressing them between dies of e.g. plastics, rubber or some other useful material. A peripheral joint has already been described above with reference to FIG. 3. FIG. 5 shows a joint which extends axially between two strainer segments 31, 32. A metal strip 33 corrugated into the same shape as the folds of the strainer is there placed over a row of plates 24 secured to the same rib 23, and overlapping end portions of the two segments 31, 32 to be joined are secured to said strip 33 by means of screws 34. If required, clamping strips may be mounted over said joint end portions.

For the rest, the construction of the filter drum is substantially known from the Swedish Patent 154,948 but it will be briefly described for the sake of completeness.

One of the tubes 18, 19 forming the axis of rotation of the drum 10 (the tube 18) is intended for the supply of fibre suspension to the interior of the drum and for this purpose said tube 18 has an outlet port 35 turned downwardly within the drum. The other tube 19 supports a funnel 36 disposed in the upper part of the drum. The wider funnel end facing upwardly extends substantially along the whole interior length of the drum to collect concentrated fibres released from the strainer surface passing over the funnel opening. The lower end of the funnel is connected to the tube 19 through which the fibre concentrate is discharged.

The two tubes 18, 19 also serve as supports for two parallel brackets 37 directed obliquely upwards at one side of the funnel 36. The brackets 37 carry a horizontal trough 38 placed close to and along the cylindrical wall of the drum. A flexible hose 39 inserted through the tube 18 connects the trough 38 to a conduit 40 for supply of a minor amount of a suspension of coarse fibres. As the drum is rotated anti-clockwise (FIG. 2), this suspension of coarse fibres is thus caused to overflow the edges of the trough 38 at the place where the drum jacket moves downwardly below the liquid level within the drum. When the drum rotates (anti-clockwise in FIG. 2), the suspension discharged from the trough 38 flows towards the adjacent part of the drum jacket on which a filtering layer of coarse fibres is formed.

A longitudinal tube 41 connected to a source of compressed air is provided above the drum 10, and said tube has nozzles 42 directed towards the drum surface to blow air through the portion of the strainer passing at the rotation. In this way the layer of fibres settled on the inside of the strainer is released and falls down into the funnel 36. In view of the bellows-like shape of the drum jacket, the air nozzles 42 are made wedge-shaped as seen in the axial section of the drum in FIG. 1, and one such nozzle is directed into each bellows fold.

The invention is not limited to the embodiment described above and shown in the drawings. Above all, the device for supplying coarse fibres, i.e. the trough 38, may be dispensed with when filtering some kinds of fibre suspensions.

I claim:

1. A rotary filter drum for concentrating diluted fibre suspensions, comprising two solid end walls, a number of parallel rods forming together a cylindrical cage which extends axially between said end walls, brackets projecting radially from the rods and arranged in axial as well as in peripheral rows, a ring mounted on each peripheral row of brackets, a bellows-shaped strainer jacket enclosing the cage and its rings between the end walls, each of said rings serving to support internally one fold of the bellows, an axial drum inlet for fibre suspension to be filtered, a funnel provided within the drum to collect concentrated fibres which are to be removed from the inside of the strainer above the liquid level in the drum, and an outlet from said funnel extending axially through one of the end walls, characterized in that said brackets consist of substantially triangular plates disposed crosswise to the folds of the bellows-shaped strainer and dimensioned to leave narrow passages along the strainer surfaces opposite to the adjacent edges of the plates, said passages serving to cause a peripherally directed flow of suspension along the inside of the strainer.

2. A rotary filter drum as claimed in claim 1, in which resilient rings are mounted externally in the folds of the strainer bellows.

3. A rotary filter drum as claimed in claim 1, in which the strainer jacket is composed of a plurality of segments joined together, the joints being supported by folded rigid strips adapted to the shape of the folds of the bellows.

References Cited by the Examiner

UNITED STATES PATENTS

| | | | |
|---|---|---|---|
| 311,873 | 2/1885 | Cochrane et al. | 209—298 |
| 2,891,671 | 6/1959 | Nilsson | 210—403 X |

REUBEN FRIEDMAN, *Primary Examiner.*

S. ZAHARNA, *Assistant Examiner.*